UNITED STATES PATENT OFFICE.

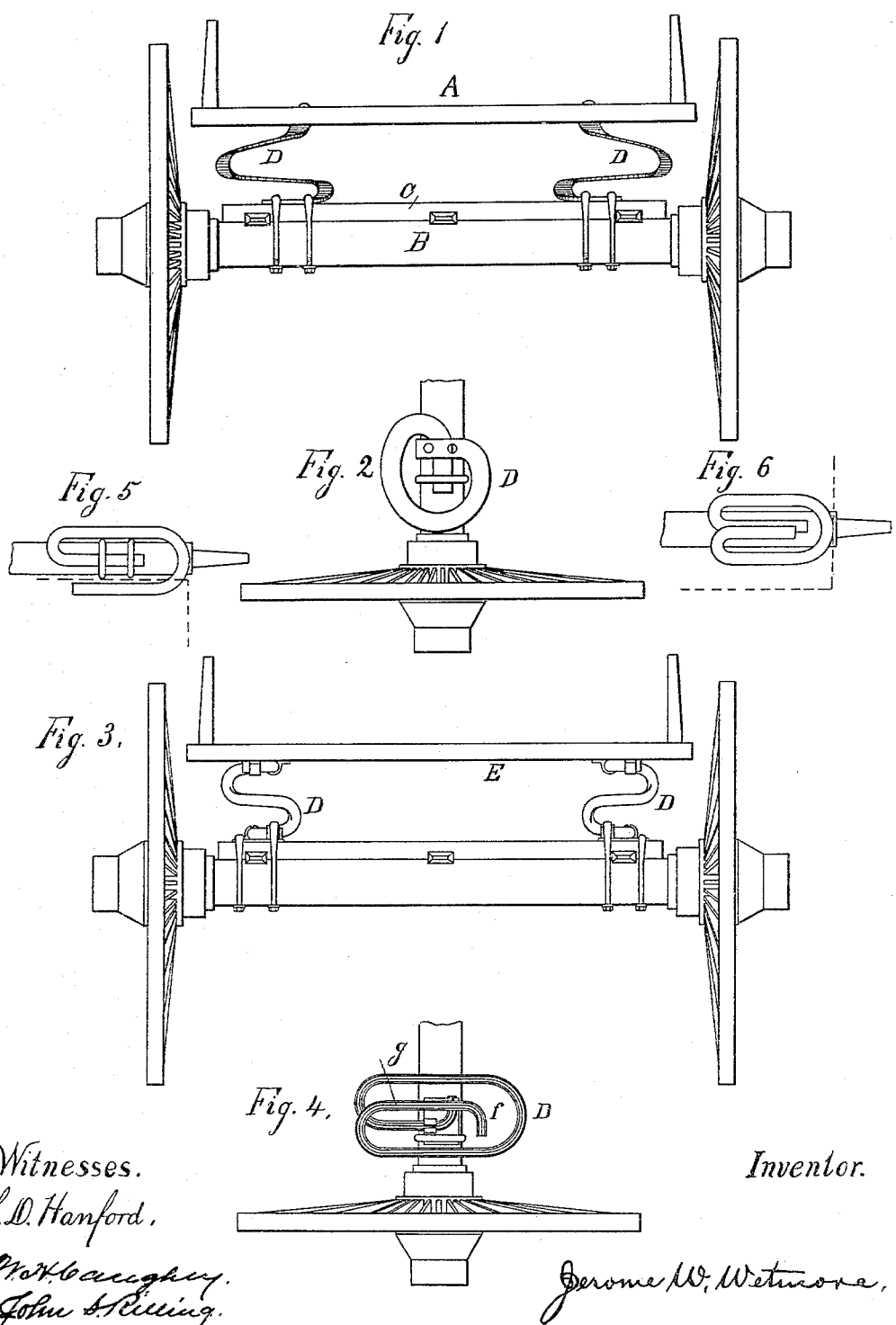

JEROME W. WETMORE, OF ERIE, PENNSYLVANIA.

VEHICLE-SPRING.

SPECIFICATION forming part of Letters Patent No. 389,035, dated September 4, 1888.

Application filed April 2, 1888. Serial No. 269,223. (No model.)

*To all whom it may concern:*

Be it known that I, JEROME W. WETMORE, a citizen of the United States, residing at Erie, in the county of Erie and State of Pennsylvania, have invented a new and useful Improvement in Vehicle-Springs, of which the following is a specification.

My invention relates to spiral torsion-springs when applied to the axle and bolster of vehicles, and the objects of my improvement are to more completely combine the advantages of the conical coil, the cylindrical coil, and the torsion-springs for vehicles. I attain these objects by the construction illustrated in the accompanying drawings, in which—

Figure 1 is a side view when the flat bar-steel is used; Fig. 2, a vertical view of the same when the bolster is removed; Fig. 5, a vertical view of the same in better form than in Fig. 2; Fig. 6, a vertical view of the same in better form for giving greater length to the spring-bar.

Short sections of the ends of the springs in Figs. 5 and 6 may be bent horizontally at right angles to give better bearings on the axle and under the bolster, in a manner similar to those in Fig. 3, and the springs may be placed across the axle and bolster, as in Figs. 3 and 4. Fig. 3 represents an end view of the spring when constructed of round steel; Fig. 4, a vertical view of the round-steel spring when the bolster is removed.

A is the bolster with the flat-spring; E, the bolster with round steel spring; B C, the axle; D, the spring; *f g*, the points where the clips are applied to hold the spring to the bolster.

The clip at *g* allows the torsional action of the upper arm of the spring. The ends of the spring being fixed, the torsional action meets near the middle of the large curve of the spring.

The space of the spring on a horizontal plane is widened by the depression under the load; but the straight or slightly-curved sections continue parallel, the widening by the depression of the two smaller curves being proximately equal each to one-half of the widening by the depression of the larger curve.

The springs across the axle are made rights and lefts, and the sidewise motion of one spring caused by the depression is counteracted by the similar motion of the other, and in both forms the flexibility of the spring will allow for changes made in the horizontal plane by the depression.

The plate on the axle may be used with the flat as well as the round bar. It is formed, Fig. 4, with open clips at right angles to each other, and the clips are closed down on the lower end of the spring. The single clip may be used with the flat-bar spring, and the lips would then be parallel with the lower end of the spring. Similar plates may be used on the bolster with the flat spring.

What I claim is—

The combination of the oblong spiral spring with and permanently attached to the axle and bolster of the vehicle, substantially as described.

In testimony whereof I affix my signature in presence of two witnesses.

JEROME W. WETMORE.

Witnesses:
   W. H. CAUGHEY,
   JOHN S. RILLING.